SYNCHRONIZATION CIRCUIT
Filed Aug. 18, 1951
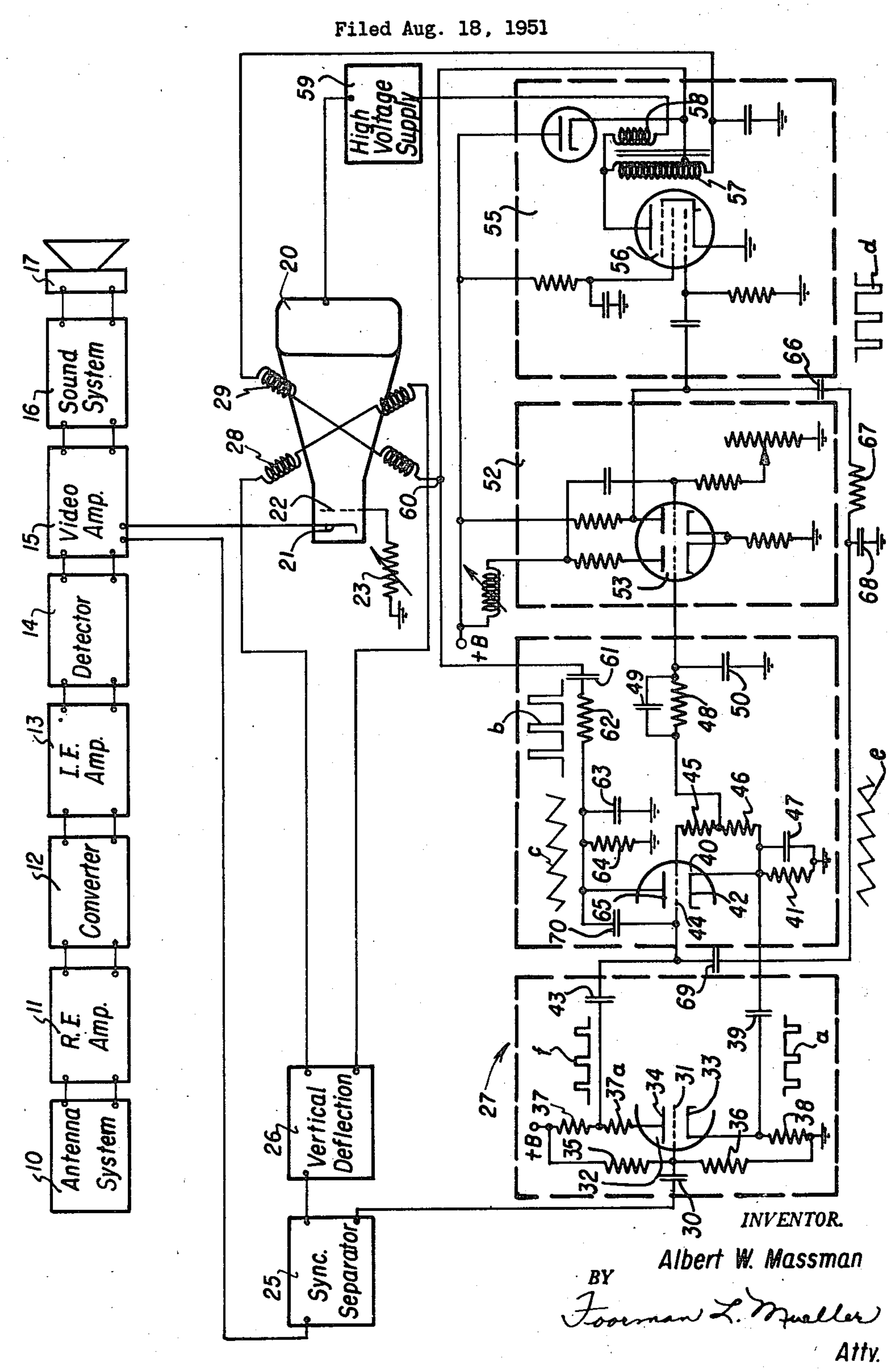
INVENTOR.
Albert W. Massman
BY
Foorman L. Mueller
Atty.

Patented July 14, 1953 2,645,717

UNITED STATES PATENT OFFICE 2,645,717

SYNCHRONIZATION CIRCUIT

Albert W. Massman, Wheaton, Ill., assignor to Motorola, Inc., Chicago, Ill., a corporation of Illinois Application August 18, 1951, Serial No. 242,527

17 Claims. (Cl. 250—36)

This invention relates generally to systems for synchronizing periodic wave generators and more particularly to a system for holding a sawtooth current generator of a television deflection system in synchronism with a pulse wave.

There are many applications in which it is desired to hold the phase of the output wave of periodic wave generators in a predetermined relation with respect to pulses of a synchronizing wave. One such application is in a television receiver wherein it is desired to hold the horizontal deflection system in synchronism with a receiver synchronizing wave. In such a system it is not desired to positively lock the deflection generators with received pulses, since noise or other conditions may provide pulses which are irregular, but it is desired to shift the frequency of the generator to compensate for variations in phase. This holds the wave of the oscillator substantially in phase with the pulses of the synchronizing wave without causing abrupt changes in frequency which have the effect of tearing the reproduced picture.

Although frequency discriminating systems are available which are suitable for this purpose, such systems have required a plurality of tube sections and other expensive components such as transformers. Simpler systems which have been available have not been completely effective in that they have not provided the same correction characteristics for variations in frequencies in both directions from the desired frequency, and/or have caused shifts in the frequency of the generator in the absence of synchronizing pulses. These systems, therefore, have not provided satisfactory operation under all conditions.

It is therefore an object of the present invention to provide a simple and improved automatic frequency control system for a periodic wave generator.

A further object is to provide an improved phase detector requiring only a single triode tube section which provides satisfactory synchronization of a sawtooth current wave generator.

A still further object of this invention is to provide a simple automatic frequency control system which provides effective correction for changes in frequency in either direction from the desired frequency.

Another object of this invention is to provide a phase detector including a single triode section which produces a zero output voltage when the frequency of an oscillator is in synchronism with a synchronizing wave, and voltages which vary plus and minus as the frequency of the oscillator deviates in one direction or the other from the frequency of the synchronizing wave.

A feature of this invention is the provision of an automatic frequency control system for a periodic wave generator including a single triode section operating as a phase detector, with positive and negative going synchronizing pulses being applied to the grid and cathode thereof, and oppositely phased sawtooth waves from the generator being applied to the plate and grid of the tube.

A further feature of this invention is the provision of a phase discriminator including a single triode with synchronizing pulses being applied to the cathode thereof and a sawtooth wave from the controlled oscillator being applied to the plate, in which a feedback capacitor is connected between the plate and the grid, and resistor means is connected between the grid and cathode, with a tap at an intermediate point thereon being at zero voltage when the sawtooth wave is in synchronism with the pulse wave, and varying plus and minus as the phase of the sawtooth wave varies in opposite directions with respect to the synchronizing wave.

Another feature of this invention is the provision of an automatic frequency control system for an oscillator which produces both positive going and negative going pulses occurring simultaneously, in which the pulses are integrated and applied respectively to the plate and grid of a triode valve, with synchronizing pulses being applied to the cathode of the valve and resistor means connected between the grid and cathode providing a path for the grid current flow. A filter is connected to the resistor means at a point which is at zero potential when the oscillator is in phase with synchronizing pulses, and applies the voltage appearing at this point to the oscillator for changing the frequency thereof to hold the same in synchronism.

Further objects and features, and the attending advantages of the invention will be apparent from a consideration of the following description when taken in connection with the accompanying drawing which is a circuit diagram of a television receiver with the standard components shown in block diagram form and the synchronizing system in accordance with the information shown in detail.

In practicing the invention there is provided a phase detector automatic frequency control system for controlling the frequency of the horizontal deflection system of a television receiver. The phase detector includes a triode valve having a cathode and grid to which equal and opposite synchronizing pulses are provided from a phase splitter. The phase splitter may also be a triode having the synchronization pulses fed to the grid thereof so that positive and negative going pulses appear at the plate and cathode thereof. The deflection system includes a multivibrator and an output stage connected to the horizontal deflection yoke. The deflection system provides both positive and negative going pulses which are applied through integrating circuits respectively to the plate and grid of the phase detector. To compensate for the nonlinear characteristics of the phase detector tube, a feedback or balancing capacitor is provided between the plate and grid thereof. Resistance means is connected between the grid and cathode of the tube providing a path for grid current, with an intermediate tap thereon being at zero potential when the various voltages applied thereto have phase relationships indicating the desired synchronization of the deflection system. This tap is connected through a filter to the multivibrator. As the phase of the output of the generator varies with respect to the synchronizing pulses, a potential is developed at the tap, being positive or negative depending upon the direction of the phase shift. This potential when applied to the multivibrator changes the frequency thereof in such sense to eliminate the phase variations and thereby hold the deflection system in step with the synchronizing pulses.

Reference is now made to the drawing in which the receiver is illustrated as including an antenna system 10, a radio frequency amplifier 11, converter 12, intermediate frequency amplifier 13, detector 14, and video amplifier 15, all connected in cascade. The output of the video amplifier is applied to a sound system 16 and to an audio reproducing device 17 which may be a standard loud speaker. The video signal is also applied to the cathode 21 of a cathode ray tube 20 for modulating the intensity of the beam thereof to reproduce a transmitted image. The tube 20 includes a grid 22 which may be connected to ground through resistor 23 which establishes the brightness level of the beam.

The video signal is also applied to synchronization signal separator 25 wherein the synchronizing pulses are derived from the composite video signals and applied to the vertical deflection system 26 and also to the horizontal deflection system indicated generally by 27. The vertical and horizontal deflection systems supply current for deflection coils 28 and 29, respectively, adjacent the cathode ray tube 20.

Negative going synchronization pulses from the synchronizing signal separator 25 are applied through the condenser 30 to the grid 31 of the triode section 32. This triode section acts as a phase splitter, with negative going pulses appearing on the cathode 33 and positive going pulses on the anode 34. Resistors 35 and 36 form a voltage divider for applying a bias to the grid 31, and resistors 37 and 37*a* connect the plate 34 to the positive potential plus B. The negative going pulse is developed across resistor 38 connected to the cathode 33.

The phase detector includes the triode section 40 which may be included in the same envelope as the triode section 32. The negative going synchronizing pulses across resistor 38 are applied through condenser 39 to resistor 41 which is connected to the cathode 42 of the triode 40. The resistor 41 is by-passed by condenser 47. Positive going synchronization pulses are applied from the plate 34 through the condenser 43 to the grid 44 of the phase detector triode. The pulses applied to cathode 42 and grid 44 are of equal amplitude and opposite phase. Connected between the grid 44 and the cathode 42 are resistors 45 and 46 connected in series which develop a control voltage. The intermediate tap between resistors 45 and 46 is connected to a filter including resistor 48 and condensers 49 and 50.

The filter applies the control voltage to the multivibrator 52 which includes a double triode 53. The multivibrator is of the cathode coupled type and as this circuit is well known, will not be described in detail. The multivibrator applies an exciting voltage wave to the output circuit 55 which includes the pentode tube 56 and an output choke 57. The horizontal deflecting coil 29 is coupled to the choke 57 and derives sweep current therefrom. The choke also includes a high voltage winding 58 connected to high voltage supply 59 which applies accelerating potential to the cathode ray tube 20.

Voltage waves are derived from the deflection system and applied to the phase detector wherein they are compared with the synchronization pulse wave. A positive going voltage wave appears at point 60 and is applied through an integrating circuit including condenser 61, resistor 62, condenser 63, and resistor 64, to the plate 65 of the triode 40. A peaked negative going sawtooth wave is derived at the output of the multivibrator 52 and the peaking or pulse component thereof developed in resistor 67 is integrated by action of the resistor 67 and condenser 68. The resulting sawtooth wave is applied through coupling condenser 69 to the grid 44 of the phase detector. A feedback or balancing condenser 70 is connected between the plate 65 and the grid 44 of the phase detector tube.

Considering now the operation of the system, the negative going synchronization pulses applied through condenser 39 to the cathode 42 has a wave form as shown by curve *a*. The positive going pulses from the deflection system at point 60 have the form shown by curve *b* and after integration form a sawtooth wave as shown by curve *c*. The negative going pulses from wave *a* tend to cause grid current to flow so that the grid will become negative. When the sawtooth applied to the plate 65 is more positive, plate current will flow causing the cathode 42 to become more positive. Therefore, resistors 45 and 46, which connect the negative grid with the positive cathode, will have an intermediate point thereon which is at zero potential. Although these two voltages alone will provide some control action, this has not been found to be satisfactory. When the synchronizing pulses are not applied to the cathode, the voltage at the intermediate point will change and will therefore cause the frequency of the multivibrator to change when the synchronization pulses are interrupted. This is obviously undesirable. Further, due to the shape of the wave applied to the plate, the control voltage will have a greater pulling-in effect for frequencies on one side of the desired frequency than on the other. Adequate control is therefore not provided to correct for wide variations.

The system is rendered quite satisfactory by providing a second sawtooth wave to the grid of the phase detector triode. This is produced by integration of the negative going pulse component of the output of the multivibrator of the horizontal deflection system. The negative going pulse wave developed across resistor 67 is shown by curve *d*, and the sawtooth wave produced by integration is shown by curve *e*. The sawtooth wave *e* is applied to the grid 44 of the tube 40, and, as it is of opposite phase to the positive going sawtooth wave *c* applied to the plate, it will tend to balance this sawtooth wave, and is effective to hold the action of the triode substantially stable when the synchronization pulses are interrupted. The second sawtooth wave (applied to the grid) also provides better pull-in from both directions.

To provide still greater stability, the positive going pulse wave from plate 34 of triode 32, which is shown by curve *f*, may be applied through capacitor 43 to the grid 44. The amplitude of the positive and negative going synchronization pulses, applied to the grid and cathode of the triode 40, respectively, can be balanced so that when the synchronization pulses are interrupted, there is no substantial result and the control voltage does not change. This balanced arrangement also eliminates any video signal that may be included with the synchronization signals. The condenser 47 connected to the cathode 42 cuts down the sawtooth wave at this point so that both the sawtooth waves and the pulse waves on the grid and cathode are equal and opposite.

It has further been found that the action of the phase detector can be rendered more linear by the provision of a feedback or balancing condenser between the plate 65 and the grid 44. This condenser is indicated at 70 and results in the provision of a relatively linear control voltage over very wide frequency ranges. In the circuit shown, a control voltage is produced which varies linearly through quite wide ranges in frequency on either side of the desired frequency of operation, and thereby corrects for wide variations in frequency in either direction.

The circuit as described has been found to be highly satisfactory in use. The following values were used in a horizontal deflection system constructed in accordance with the circuit shown.

| | |
|---|---|
| Triode 40 | (½) 6SN7 |
| Condenser 70 | 100 micromicrofarads |
| Synchronizing pulse wave *a* | 12 volts negative |
| Condenser 39 | 500 micromicrofarads |
| Synchronizing pulse wave *f* | 12 volts positive |
| Condenser 43 | 500 micromicrofarads |
| Voltage pulse wave *b* | 2500 volts positive |
| Condenser 61 | .01 microfarad |
| Resistor 62 | 200,000 ohms |
| Condenser 63 | .002 microfarad |
| Resistor 64 | 100,000 ohms |
| Sawtooth wave *c* | 20 volts (peak-to-peak) |
| Pulse wave *d* | 200 volts negative |
| Condenser 66 | 680 micromicrofarads |
| Resistor 67 | 4700 ohms |
| Condenser 68 | .01 microfarad |
| Sawtooth wave *e* | 5 volts (peak-to-peak) |
| Condenser 69 | 500 micromicrofarads |
| Resistor 41 | 100,000 ohms |
| Resistor 45 | 82,000 ohms |
| Resistor 46 | 82,000 ohms |
| Condenser 47 | .001 microfarad |

| | |
|---|---|
| Resistor 48 | 4.7 megohms |
| Condenser 49 | .001 microfarad |
| Condenser 50 | .01 microfarad |
| Tube 53 | 6SN7 |

The circuit as above described has been found to be very satisfactory and since it includes only a single triode section and inexpensive coupling components, it is of very inexpensive construction. Although a great number of different voltages are applied to the phase detector tube, these voltages are all readily available from standard circuits. These voltages are applied in such manner to provide effective control with changes in phase of either sign, and also so that failure of the synchronization signal does not cause a shift in the control voltage. The use of the feedback capacitor between the plate and grid of the phase discriminator tube provides a substantially linear characteristic over very wide frequency ranges.

Although one embodiment of the invention has been disclosed which is illustrative thereof, it is obvious that many changes and modifications can be made therein within the intended scope of the invention as defined in the appended claims.

I claim:

1. A system for synchronizing a generator with a synchronizing pulse wave, including in combination, an electron discharge valve having a cathode, an anode and a control grid, means for applying said synchronizing pulse wave to said cathode of said valve as a negative going wave and to said control grid thereof as a positive going wave, means for providing oppositely phased sawtooth voltage waves from the generator output and applying the same to said anode and said grid of said valve, resistance means having terminals connected to said grid of said valve and to said cathode thereof, and means coupled to said resistance means intermediate the terminals thereof for supplying to the generator a control voltage which varies in amplitude and polarity in accordance with the phase of the output of the generator with respect to the phase of said synchronizing pulse wave for controlling the frequency of the generator.

2. A system for synchronizing oscillator means which produces positive and negative going pulses with a synchronizing pulse wave, including in combination, an electron discharge valve having a cathode, an anode and a control grid, means for applying said synchronizing pulse wave to said cathode of said valve as a negative going wave and to said control grid thereof as a positive going wave, means for integrating the positive going pulses from the oscillator means and applying the same to said anode of said valve, means for integrating the negative going pulses from the oscillator means and applying the same to said grid of said valve, and output circuit means including resistance means connecting said grid of said valve to said cathode thereof for providing a control voltage which varies in accordance with the phase of said oscillator means with respect to the phase of said synchronizing pulse wave for controlling the frequency of said oscillator means.

3. A system for synchronizing generator means which produces a sawtooth wave with a synchronizing pulse wave, including in combination, an electron discharge valve having a cathode, an anode and a control grid, means for applying said synchronizing pulse wave to said grid of said valve as a positive going wave, means coupled to said generator means for deriving therefrom oppositely phased sawtooth voltage waves and for applying the same to said anode and to said control grid of said valve, resistance means connecting said grid of said valve to said cathode thereof, and means coupled to said resistance means for supplying to the generator means a control voltage which varies in accordance with the phase of the pulses produced by the generator means with respect to the phase of said synchronizing pulse wave for controlling the frequency of said generator means.

4. A system for synchronizing an oscillator with a synchronizing pulse wave, wherein the oscillator may be controlled in frequency by a control voltage, and the output thereof includes positive and negative going pulse waves, said system including in combination, an electron discharge valve having a cathode, an anode and a control grid, means for applying said synchronizing pulse wave to said cathode of said valve as a negative going wave and to said control grid thereof as a positive going wave, means for integrating the positive going pulse wave from the oscillator and applying the same to said anode of said valve, means for integrating the negative going pulse wave from the oscillator and applying the same to said grid of said valve, resistance means connecting said grid of said valve to said cathode thereof, and filter means coupled to said resistance means and to the oscillator for providing a control voltage which varies in accordance with the phase of the oscillator output with respect to the phase of said synchronizing pulse wave for controlling the frequency of the oscillator.

5. A system for synchronizing a sawtooth current wave generator with a synchronizing pulse wave including in combination, first and second electron discharge valves each having a cathode, an anode and a control grid, means for applying said synchronizing pulse wave to said grid of said first valve so that a pulse wave of one polarity is developed at the anode of said first valve and a pulse wave of the opposite polarity is developed at the cathode thereof, means for applying the negative going pulse wave produced by said first valve to the cathode of said second valve and the positive going pulse wave produced by said first valve to said control grid thereof, means for providing oppositely phased sawtooth voltage waves from the generator output and applying the same to said said anode and said grid of said second valve, resistance means connecting said grid of said second valve to said cathode thereof, filter means coupled to said resistance means for providing a control voltage which varies in accordance with the phase of the wave from said generator with respect to the phase of said synchronizing pulse wave, and means for applying said control voltage to said generator for controlling the frequency thereof.

6. A system for synchronizing oscillator means with a synchronizing pulse wave, wherein the oscillator means produces recurring voltage pulses and may be controlled in frequency by a control voltage, said system including in combination, first and second electron discharge valves each having a cathode, an anode and a control grid, means for applying said synchronizing pulse wave to said grid of said first valve so that a pulse wave of one polarity is developed at the anode of said first valve and a pulse wave of the opposite polarity is developed at the cathode thereof, means for applying the negative going pulse wave produced by said first valve to the cathode of said second valve and the positive going pulse wave produced by said first valve to said control grid thereof, means for integrating the voltage pulses from the oscillator means and applying the same to said anode of said second valve, resistance means connecting said grid of said second valve to said cathode thereof, and filter means coupled to said resistance means at a point thereon intermediate the connections thereof to said cathode and said control grid of said second valve and to the oscillator means for providing a control voltage which varies in accordance with the phase of said oscillator with respect to the phase of said synchronizing pulse wave for controlling the frequency of the oscillator, said pulse waves of opposite polarity applied to said cathode and said control grid of said second valve being substantially balanced out at said intermediate point on said resistance means.

7. A system for synchronizing an oscillator which produces positive and negative going pulses with a synchronizing pulse wave including in combination, an electron discharge valve having a cathode, an anode and a control grid, means for applying said synchronizing pulse wave to said cathode of said valve as a negative going wave and to said control grid thereof as a positive going wave, means for integrating the positive going pulses from the oscillator and applying the same to said anode of said valve, means for integrating the negative going pulses from the oscillator and applying the same to said grid of said valve, a feedback condenser connecting said anode and said control grid of said valve, and output circuit means including resistance means connecting said grid of said valve to said cathode thereof for providing a control voltage which varies in accordance with the phase of said oscillator with respect to the phase of said synchronizing pulse wave for controlling the frequency of said oscillator.

8. A system for synchronizing a generator which produces recurring positive and negative going pulses with a synchronizing pulse wave including in combination, an electron discharge valve having a cathode, an anode and a control grid, means for applying said synchronizing pulse wave to said cathode of said valve as a negative going wave, means for integrating the positive going pulses from the generator and applying the same to said anode of said valve, means for integrating the negative going pulses from the generator and applying the same to said grid of said valve, a feedback condenser connecting said anode and said control grid of said valve, and output circuit means including resistance means connecting said grid of said valve to said cathode thereof for providing a control voltage which varies in accordance with the phase of said pulses produced by said generator with respect to the phase of said synchronizing pulse wave for controlling the frequency of said generator, said integrated pulse wave applied to said control grid of said valve acting to counteract the effect of said integrated pulse wave applied to said plate thereof and hold said control voltage substantially stable in the event of failure of the synchronizing pulse wave.

9. A system for synchronizing a sawtooth wave generator including a multivibrator stage and an output stage with a synchronizing pulse wave including in combination, an electron discharge valve having a cathode, an anode and a control grid, means for applying said synchronizing pulse wave to said cathode of said valve as a negative going wave and to said control grid thereof as a positive going wave, means coupled to said output stage of said generator and to said anode of said valve, for applying a positive going sawtooth wave from said generator to said anode, means coupled to said multivibrator stage of said generator and to said grid of said valve for applying a negative going sawtooth wave from said generator to said grid, and circuit means including resistance means connecting said grid of said valve to said cathode thereof for providing a control voltage which varies in accordance with the phase of said generator with respect to the phase of said synchronizing pulse wave, said circuit means including a portion coupled to said multivibrator stage for controlling the frequency of said generator.

10. A system for synchronizing an oscillator which produces positive and negative going pulse waves with a synchronizing pulse wave including in combination, an electron discharge valve having a cathode, an anode and a control grid, phase inverter means for applying said synchronizing pulse waves to said cathode of said valve as a negative going wave and to said control grid thereof as a positive going wave, means for integrating the positive going pulse wave from the oscillator and applying the same to said anode of said valve, means for integrating the negative going pulse wave from the oscillator and applying the same to said grid of said valve, a feedback condenser connecting said anode and said control grid of said valve, and output circuit means including resistance means having terminals connected to said grid of said valve and to said cathode thereof, and means coupled to said resistance means intermediate the terminals thereof for providing a control voltage for controlling the frequency of said oscillator which varies in amplitude and polarity with the phase of said pulse waves produced by said oscillator with respect to the phase of said synchronizing pulse wave, said connection to said resistance means being selected so that said output circuit provides zero potential when the oscillator is synchronized with said synchronizing pulse wave.

11. A system for synchronizing a sawtooth wave generator with a synchronizing pulse wave, which generator includes a first stage for producing a sawtooth voltage wave and a second stage for producing a sawtooth current output wave, said system including in combination, an electron discharge valve having a cathode, an anode and a control grid, means for applying said synchronizing pulse wave to said cathode of said valve as a negative going wave and to said control grid thereof as a positive going wave, means coupled to said second stage of said generator and to said anode of said valve for applying a positive going sawtooth wave from said generator to said anode, means coupled to said first stage of said generator and to said grid of said valve for applying a negative going sawtooth wave from said generator to said grid, bias developing means including resistance means having terminals connected to said grid of said valve and to said cathode thereof, and means coupled to said resistance means intermediate the terminals thereof for providing a control voltage which varies in amplitude and polarity in accordance with the phase of said generator with respect to the phase of said synchronizing pulse wave, said biasing means producing a zero potential control voltage when said oscillator is synchronized with said pulse wave, and means for applying said control voltage developed by said bias developing means to said first stage for controlling the frequency of the sawtooth voltage wave produced thereby.

12. A system for synchronizing an oscillator with a synchronizing pulse wave including in combination, an electron discharge valve having a cathode, an anode and a control grid, means for applying said synchronizing pulse wave to said cathode of said valve as a negative going wave and to said control grid thereof as a positive going wave, means coupled to said oscillator for producing a positive going pulse wave having a predetermined phase relation with the oscillator output and for applying a wave derived therefrom to said anode of said valve, a feedback condenser connecting said anode and said control grid of said valve, and output circuit means including resistance means having terminals connected to said grid of said valve and to said cathode thereof, and means connected to said resistance means intermediate the terminals thereof for providing a control voltage for controlling the frequency of said oscillator which varies in amplitude and polarity with the phase of said pulse waves produced by said oscillator with respect to the phase of said synchronizing pulse wave, said connection to said resistance means being selected so that said synchronization pulses applied to said cathode and said control grid are substantially balanced out at said connection and said output circuit provides a control voltage of zero potential when the oscillator output is synchronized with said synchronizing pulse wave.

13. A system for synchronizing a sawtooth wave generator with a synchronizing wave including in combination, an electron control valve having at least three electrodes, means responsive to the aforesaid synchronizing wave for producing a first positive going pulse wave and a second negative going pulse wave respectively in phase and in phase opposition with the synchronizing wave, biasing means for applying said first and second pulse waves respectively to first and second electrodes of said control valve to bias the same and to establish a voltage across said first and second electrodes wherein said pulse waves are additively combined, resistance means connected between said first and second electrodes, having an intermediate point at which said pulse waves cancel, means for deriving a sawtooth wave from the aforesaid generator and for applying said sawtooth wave to a third electrode of said valve to control the voltage produced by said pulse wave on one of said first and second electrodes in accordance with the phase relation between said sawtooth wave and said synchronizing pulse wave whereby the voltage at said intermediate point varies with the said phase relation, and means coupling said intermediate point on said resistance means to the generator for applying a control voltage varying in amplitude with phase variations of said sawtooth wave with respect to the synchronizing pulse wave to control the frequency of the generator.

14. A system for synchronizing a sawtooth wave generator with a synchronizing wave including in combination, an electron control valve having at least first, second and third electrodes, means responsive to the aforesaid synchronizing wave for producing first and second pulse waves of opposite polarity, biasing means for applying said first and second pulse waves respectively to said first and second electrodes of said control valve to bias the same and to establish a voltage across said first and second electrodes wherein said pulse waves are additively combined, resistance means connected between said first and second electrodes, having an intermediate point at which said pulse waves cancel, means for deriving oppositely phased sawtooth voltage waves from the aforesaid generator and for applying said sawtooth waves to said first and third electrodes of said valve, said sawtooth waves applied to said third electrode controlling the voltage produced by said pulse wave on one of said first and second electrodes in accordance with the phase relation between said sawtooth wave and said synchronizing pulse wave whereby the voltage at said intermediate point varies with the said phase relation, said sawtooth wave applied to said first electrode operating to balance the effect of said sawtooth wave applied to said third electrode at said intermediate point in the absence of said pulse waves, and means coupling said intermediate point on said resistance means to the generator for applying a control voltage varying in amplitude with phase variations of said sawtooth wave with respect to the synchronizing pulse wave to control the frequency of the generator.

15. A system for synchronizing a sawtooth wave generator with a synchronizing wave including in combination, an electron control valve having at least three electrodes, means responsive to the aforesaid synchronizing wave for producing a positive going pulse wave and a negative going pulse wave respectively in phase and in phase opposition with the synchronizing wave, means for applying one of the aforesaid pulse waves to a first of said electrodes of said control valve to establish a bias of a selected polarity on said first electrode, means for applying the other of the aforesaid pulse waves to a second of said electrodes of said control valve to establish on said second electrode a bias of inverted polarity with respect to the bias on said first electrode, resistance means connected from said first electrode to said second electrode, means for deriving a sawtooth wave from the aforesaid generator and for applying said sawtooth wave to a third one of said electrodes to control the value of the aforesaid bias on said first electrode in accordance with the phase relation between said sawtooth wave and said synchronizing wave, and means coupling an intermediate point on said resistance means to the generator for applying a control voltage varying in amplitude about a selected potential axis with phase variations of said sawtooth wave with respect to said synchronizing wave to control the frequency of the genenator, said intermediate point on said resistance means being so selected that the pulse waves of opposite polarity applied to said first and second electrodes are substantially balanced out at said intermediate point.

16. A system for synchronizing a sawtooth wave generator with a synchronizing pulse wave, including in combination, an electron discharge valve having a cathode, an anode and a control grid, means for applying said synchronizing pulse wave to said cathode of said valve as a negative going wave and to said control grid thereof as a positive going wave, means coupled to the generator for deriving a sawtooth voltage wave therefrom and applying the same to said anode of said valve, resistance means connecting said grid of said valve to said cathode thereof, said resistance means having an intermediate tap thereon, and means coupled to said tap on said resistance means for supplying to the generator a control voltage which varies in accordance with the phase of said generator with respect to the phase of said synchronizing pulse wave for controlling the frequency of said generator, said resistance means acting to substantially balance out said synchronizing pulse waves applied to said cathode and said control grid at said tap.

17. A system for synchronizing a generator with a synchronizing pulse wave, wherein the generator produces a sawtooth wave and may be controlled in frequency by a control voltage, said system including in combination, an electron discharge valve having a cathode, an anode and a control grid, means for applying said synchronizing pulse wave to said cathode of said valve as a negative going wave, means coupled to the generator for deriving therefrom oppositely phased sawtooth voltage waves and applying the same respectively to said anode and said grid of said valve, resistance means connecting said grid of said valve to said cathode thereof, and filter means coupled to said resistance means for providing a control voltage which varies in accordance with the phase of the sawtooth waves from the generator with respect to the phase of said synchronizing pulse wave for controlling the frequency of the generator, said oppositely phased sawtooth waves acting to substantially balance out the effect of each other on said control voltage in the event of failure of the synchronizing pulse wave.

ALBERT W. MASSMAN.

References Cited in the file of this patent

UNITED STATES PATENTS

| Number | Name | Date |
|---|---|---|
| 2,488,567 | Stodola | Nov. 22, 1949 |
| 2,503,700 | Barco | Apr. 11, 1950 |
| 2,561,817 | Parker | July 24, 1951 |
| 2,564,588 | Wendt | Aug. 14, 1951 |
| 2,566,762 | English | Sept. 4, 1951 |
| 2,598,370 | Gruen | May 27, 1952 |